(12) United States Patent
Eriksson et al.

(10) Patent No.: US 11,679,428 B2
(45) Date of Patent: Jun. 20, 2023

(54) CONNECTION TUBE AND ITS METHOD OF MANUFACTURING

(71) Applicant: SANDVIK INTELLECTUAL PROPERTY AB, Sandviken (SE)

(72) Inventors: Olle Eriksson, Sandviken (SE); Henrik Häll, Sandviken (SE)

(73) Assignee: Sandvik Intellectual Property AB, Sandviken (SE)

(*) Notice: Subject to any disclaimer, the term of this patent is extended or adjusted under 35 U.S.C. 154(b) by 939 days.

(21) Appl. No.: 16/472,238

(22) PCT Filed: Dec. 22, 2017

(86) PCT No.: PCT/EP2017/084513
§ 371 (c)(1),
(2) Date: Jun. 21, 2019

(87) PCT Pub. No.: WO2018/115501
PCT Pub. Date: Jun. 28, 2018

(65) Prior Publication Data
US 2019/0314877 A1    Oct. 17, 2019

(30) Foreign Application Priority Data
Dec. 23, 2016    (EP) .................................... 16206891

(51) Int. Cl.
*B21C 33/00*    (2006.01)
*B21C 37/15*    (2006.01)
(Continued)

(52) U.S. Cl.
CPC .......... *B21C 33/004* (2013.01); *B21C 37/154* (2013.01); *B21D 39/04* (2013.01); *F16L 13/007* (2013.01)

(58) Field of Classification Search
CPC ..... B21C 37/154; B21C 37/06; B21C 33/004; B21D 39/04; F16L 13/007
See application file for complete search history.

(56) References Cited

U.S. PATENT DOCUMENTS 2,761,205 A * 9/1956 Siklosi ................... B21D 39/04
                                                        285/333
3,140,108 A * 7/1964 Klein .................... B21C 33/004
                                                        428/685
(Continued)

FOREIGN PATENT DOCUMENTS

BE           511483 A      6/1952
CN       104132207 A     11/2014
(Continued)

OTHER PUBLICATIONS

Examination Report dated Jul. 29, 2021 in Indian Patent Application No. 201927023529.
(Continued)

*Primary Examiner* — Bayan Salone
(74) *Attorney, Agent, or Firm* — Morgan, Lewis & Bockius LLP

(57) ABSTRACT

A connection tube (1) for connecting two tubes (8, 9) of different alloys, wherein the connection tube has a central through-hole extending along a longitudinal axis and comprises a first end portion (2) of a first alloy, a second end portion (3) of a second alloy, and a middle portion (4) which is at least partly double-layered with said second alloy forming an annular inner layer and said first alloy forming an annular outer layer, wherein a metallic bond has been formed between said layers. The inner and outer layers are mechanically interlocked by means of at least one helically extending thread formed in an interface between said layers. The connection tube is manufactured from a base compo- (Continued)

nent and an outer component threaded onto the base component to form a work piece, which is hot worked to form a metallic bond.

13 Claims, 4 Drawing Sheets

(51) Int. Cl.
    *B21D 39/04*      (2006.01)
    *F16L 13/00*      (2006.01)
    *F16L 13/007*      (2006.01)

(56) References Cited

U.S. PATENT DOCUMENTS

| | | | | |
|---|---|---|---|---|
| 3,208,776 | A | * | 9/1965 | Buschow ............ F16L 13/007 285/286.1 |
| 3,604,102 | A | * | 9/1971 | Boccalari ............ B21C 23/22 228/159 |
| 7,607,333 | B2 | * | 10/2009 | Sivley, IV ............ F16L 15/004 72/367.1 |

FOREIGN PATENT DOCUMENTS

| | | | | |
|---|---|---|---|---|
| CN | 205424245 U | * | 8/2016 | |
| CN | 205424245 U | | 8/2016 | |
| DE | 906167 C | * | 3/1954 | ........... B23K 33/006 |
| DE | 906167 C | | 3/1954 | |
| GB | 1258141 A | | 12/1971 | |
| JP | 2013-044423 A | | 3/2013 | |

OTHER PUBLICATIONS

Translation of Office Action dated Apr. 17, 2020, issued in corresponding Chinese Patent Application 201780079575.9.

International Search Report and Written Opinion dated Apr. 26, 2018, issued in corresponding International Patent Application No. PCT/EP2017/084513.

* cited by examiner

CONNECTION TUBE AND ITS METHOD OF MANUFACTURING

TECHNICAL FIELD

The present disclosure relates to a connection tube for connecting two tubes according to the preamble of claim 1. It further relates to a method for manufacturing such a connection tube according to the preamble of claim 5, a method for connecting two tubes of different alloys, and a tubular product comprising a connection tube.

BACKGROUND AND PRIOR ART

For many industrial applications, there is a need to join tubes of different alloys and form a tubular product that is composed of several tube portions. This can be for example to save costs, since one part of a tube may be exposed to more demanding conditions than another part of the tube, which can therefore be made from a less expensive alloy. It may also be in order to tailor tubes that are likely to be subjected to demanding conditions varying along the tube, such as highly corrosive conditions along part of the tube and conditions requiring high mechanical strength along another part of the tube.

GB1258141 discloses a method for joining two tubes of different alloys that are difficult to join by welding. According to this method, a connection tube is produced that has a first end portion of a first alloy, compatible with the alloy of one of the tubes, and a second end portion of a second alloy, compatible with the alloy of the other one of the tubes. Between the end portions, there is a middle portion in which the first alloy forms an outer layer and the second alloy forms an annular inner layer. A metallic bond has been formed between the layers by means of hot extrusion. The two tubes can thereafter be welded to the respective end portions of the connection tube.

Production of the connection tube disclosed in GB1258141 involves forming a composite tube that has an annular outer layer of the first alloy and an annular inner layer of the second alloy. The diameter of a first end portion of the composite tube is reduced, such that a portion with a gradually decreasing diameter is formed between the first end portion and a middle portion of the composite tube. The annular inner layer is thereafter removed from the first end portion and the annular outer layer is removed from the second end portion. For making the composite tube, two tubular components are provided, wherein one of the components is inserted into the other component to form a billet. Longitudinal splines are used to provide a mechanical interlock between the components. The billet is enclosed in a toroidal metal case forming a vacuum tight seal around the billet. However, enclosing the billet in a vacuum pumped case is complicated, expensive and difficult to implement in a production line.

SUMMARY

In view of the above-mentioned difficulties, it is desirable to provide means for joining two tubes of alloys that are difficult to join by welding, which is in at least some aspect improved with respect to previously known such means.

According to a first aspect of the present disclosure, this is achieved by means of the initially defined connection tube, which is characterised in that the annular inner layer and the annular outer layer are mechanically interlocked by means of at least one helically extending thread formed in an interface between said layers and in that said interface also has metallic bond which is formed between the threaded sections. By the term "connection tube" is meant a tube which will form a means for connecting two tubes of different materials. Thus, a connection tube is a tube which is used for connecting two tubes of different alloys and which also will allow welding between compatible alloys in the ends of the connection tube. By different alloys is meant that the composition of the alloys will be different, for example the ranges of alloying elements will differ or the composition may contain at least one different alloying element.

Further, the connecting tube according to the present disclosure may be efficiently produced in comparison with connection tubes manufactured according to previously known methods. The connection tube is also very stable due to the combination of the metallic bond and the mechanical interlock provided by the helically extending thread, which will increase the interfacial area between the annular inner and annular outer layers. Furthermore, the combination of a mechanical interlock in the form of a helically extending thread and a metallic bond between the layers is beneficial for the ability of the connection tube to withstand high forces. The helically extending thread forms an efficient interlock and also increases the interfacial area, which will thereby contribute to an improved distribution of forces applied to the connection tube in comparison with a connection tube without such a helically extending thread. Thus, the connection tube will be able to withstand higher forces in the interface between the layers.

The metallic bond can be formed by means of hot working, such as hot extrusion, hot drawing, hot rolling or hot piercing, or other suitable techniques. The mechanical interlocking between the layers is provided before hot working. The mechanical interlock in the form of a helical thread will form a seal preventing oxygen from entering between the annular inner and annular outer layers during hot working, and it will also keep the components that are to form the annular inner and outer layers together during hot working. The mechanical interlock thereby makes it possible to achieve the proposed connection tube without having to use a vacuum pumped case enclosing a work piece which is to be extruded to form a composite tube from which the connection tube is formed. Thus, the connection tube can be formed without welding.

The inner and outer diameters of the connection tube may be different or equal at the first and the second end portions respectively, depending on the dimensions of the tubes which are to be connected by means of the connection tube and the desired properties of the connection tube.

The proposed connection tube is configured for joining one tube to the first end portion of the connection tube and another tube to the second end portion of the connection tube. The tubes can be joined to the respective end portions by means of welding or by mechanical means, such as by threaded engagement. It is also possible to use a combination of those techniques.

According to one embodiment, an inner diameter at the first end portion equals an inner diameter at the second end portion. The inner diameter may be constant or essentially constant along the longitudinal axis. The connection tube thereby has properties suitable for achieving a laminar flow of fluid through the connection tube. By "essentially constant" is herein intended a variation of less than ±10% of an average inner diameter.

According to one embodiment, the middle portion has a larger wall thickness than each of the end portions. For example, the outer diameter of the connection tube may be larger at the middle portion than at each of the end portions, while the inner diameter is the same along the connection tube. A larger interface between the annular inner and outer layers can thereby be achieved.

According to one embodiment, at least one of the end portions is provided with an internal or external thread adapted for threaded engagement with a threaded end of a tube. The connection tube is thereby adapted for connection of alloys that are inherently difficult to join by welding. For example, such a threaded joint can be useful to join an iron chromium aluminium (FeCrAl) alloy tube to a first end portion made of the same alloy. If the second end portion of the connection tube is e.g. a carbon steel, a carbon steel tube can be joined to the second end portion by means of welding.

According to another aspect, the disclosure relates to the initially defined method for manufacturing a connection tube for connecting two tubes of different alloys, which is characterised in that the step of forming a composite tube comprises the steps of:
  providing an annular base component of the second alloy, wherein the annular base component has a central through-hole extending along a longitudinal axis of the annular base component, and wherein the annular base component has an externally threaded section,
  providing an annular outer component of the first alloy, wherein the annular outer component has an internally threaded section configured to engage with the externally threaded section of the annular base component,
  forming a tubular work piece by mounting the annular outer component around the annular base component such that the internally threaded section of the annular outer component is in engagement with the externally threaded section of the annular base component, forming a mechanical interlock between the threaded sections,
  hot working the work piece, so that on one hand a metallic bond is formed between the threaded sections of the annular outer component and the annular base component while the mechanical interlock is maintained, and so that on the other hand the work piece is elongated and an outer diameter of the work piece is reduced, thus forming a composite tube.

By mechanically interlocking the base component and the outer component by means of threaded engagement prior to hot working, a mechanical seal is formed. Additionally, the threading will create a large contact area between the surfaces of the annular base component and annular component, as the contact area will become greater thereby the area where the metallic bonds will be formed will also increase. Thus, the conditions for forming a metallic bond will be improved. It has furthermore been found that the mechanical seal provided by the threading is sufficient for preventing oxygen from entering between the annular base component and the annular outer component. The helical threading also efficiently prevents the components from both separating and sliding during hot working.

The annular base and outer components may be configured so that, when the annular outer component has been threaded onto the annular base component, further axial movement of the outer component with respect to the base component is prevented. For this purpose, a stopping means can be provided at an end of the externally threaded section of the base component, preventing a leading end of the outer component during threading to be advanced further. Such a stopping means can for example be a section with a larger outer diameter than the outer diameter at the externally threaded section, or an externally projecting stopping member. An alternative is to provide a stopping means at a trailing end of the internally threaded section, preventing the trailing end from advancing further onto the base component in the axial direction. Such a stopping means can be in the form of a section with a smaller inner diameter than the inner diameter at the internally threaded section, or an internally projecting stopping member.

According to the proposed method, a metallic bond is formed between the annular base and outer components during hot working while the mechanical interlock is maintained. The mechanical interlock, which can be seen as a helix formed in an interface between the annular inner and outer layers of the connection tube, increases the area of the interface and may thereby contribute to an improved distribution of forces applied to the connection tube in comparison with a connection tube without such a helix. Thus, connection tubes manufactured according to the proposed method may be able to withstand higher load in the interface.

The metallic bond is formed by means of hot working, such as hot extrusion, hot drawing, hot rolling or hot piercing, or other suitable techniques.

According to one embodiment, the composite tube has a dimension defined by an outer diameter, an inner diameter and an interfacial diameter, and the step of working the first end portion of the composite tube is carried out such that the interfacial diameter of the first end portion corresponds to the inner diameter of the middle portion. This can for example be achieved by means of compression or tube drawing and facilitates formation of a connection tube having an inner diameter that is constant along the longitudinal axis.

According to one embodiment, the method as defined herein optionally comprises a step of working the second end portion. This can be carried out such that the interfacial diameter of the second end portion corresponds to an outer diameter of the first portion. This can for example be achieved by means of expansion or upsetting and facilitates formation of a connection tube having an inner diameter that is constant along the longitudinal axis. Hence, both the first and second end portion may be worked and the working may be the same or different.

According to one embodiment, the step of removing the annular inner layer comprises cutting machining and/or abrasive machining.

According to one embodiment, the step of removing the annular outer layer comprises cutting machining and/or abrasive machining. Cutting machining and abrasive machining can efficiently remove desired portions of the annular inner and/or outer layer(s).

According to one embodiment, the externally threaded section extends along an entire axial length of the annular base component. The annular base component is thereby well-suited for forming a double-layered composite tube with both layers extending along an entire axial length of the tube. As discussed above, a stopping means may be provided.

According to one embodiment, the internally threaded section extends along an entire axial length of the annular outer component. If the threaded sections have equal lengths, the risk that oxygen enters between the components will be minimized and the conditions are well-suited for forming a metallic bond between the annular inner and outer layers of the composite tube.

According to one embodiment, the step of hot working comprises hot extrusion. Hot extrusion is suitable for forming a metallic bond between the annular base component and the annular outer component while at the same time efficiently elongating and reducing the outer diameter of the work piece.

According to one embodiment, the first alloy is selected from a stainless steel alloy, a nickel-based alloy, an iron chromium aluminium alloy, a carbon steel alloy, a zirconium alloy, an aluminium alloy, a copper alloy, or a titanium alloy.

According to one embodiment, the second alloy has a different composition than the first alloy and is selected from a stainless steel alloy, a nickel-based alloy, an iron chromium aluminium alloy, a carbon steel alloy, a zirconium alloy, an aluminium alloy, a copper alloy, or a titanium alloy. The first and second alloys should be selected such as to match alloys of the tube that are to be connected by means of the connection tube.

According to another aspect, the disclosure relates to a method for connecting two tubes of different alloys, comprising the steps of:
 providing the proposed connection tube, wherein the first alloy is compatible with an alloy of a first one of said two tubes, and wherein the second alloy is compatible with an alloy of a second one of said two tubes,
 joining the first tube and the first end portion of the connection tube together,
 joining the second tube and the second end portion of the connection tube together.

According to one embodiment, joining at least one of the first tube and the second tube with the connection tube comprises welding.

According to another aspect, the disclosure relates to a tubular product comprising a first tube, a second tube and the proposed connection tube, wherein the first tube is joined with the first end portion of the connection tube, and wherein the second tube is joined with the second end portion of the connection tube.

According to one embodiment, a welded joint is formed between the connection tube and at least one of the first tube and the second tube.

Other advantageous features as well as advantages of the disclosure will appear from the following description.

BRIEF DESCRIPTION OF THE DRAWINGS

Embodiments of the disclosure, not to be interpreted as limiting, will in the following be described with reference to the appended drawings, in which FIG. 1 schematically shows a longitudinal cross section of a connection tube according to an embodiment.

DETAILED DESCRIPTION

Figure 1:
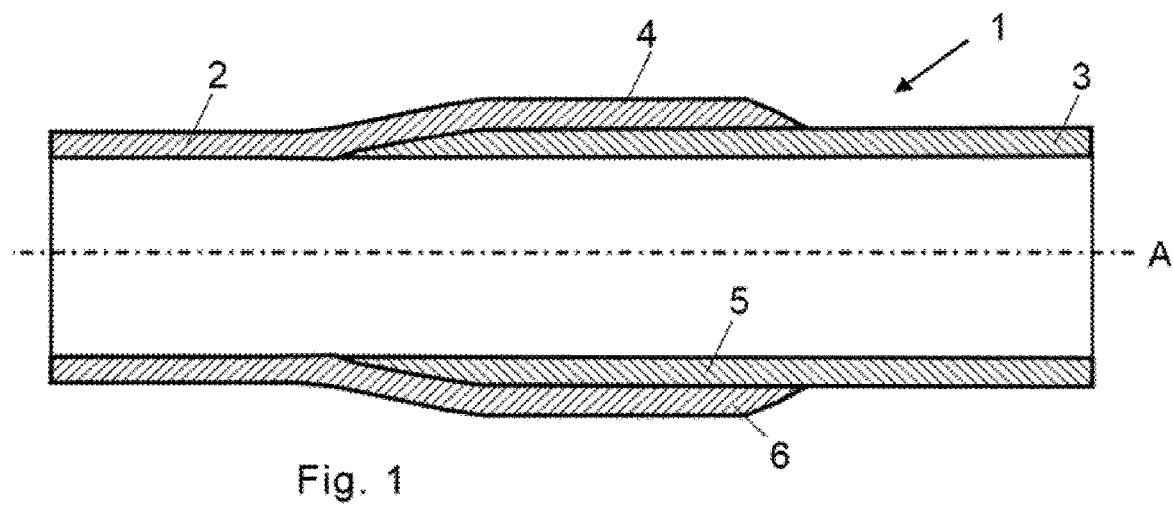
Figure 2:
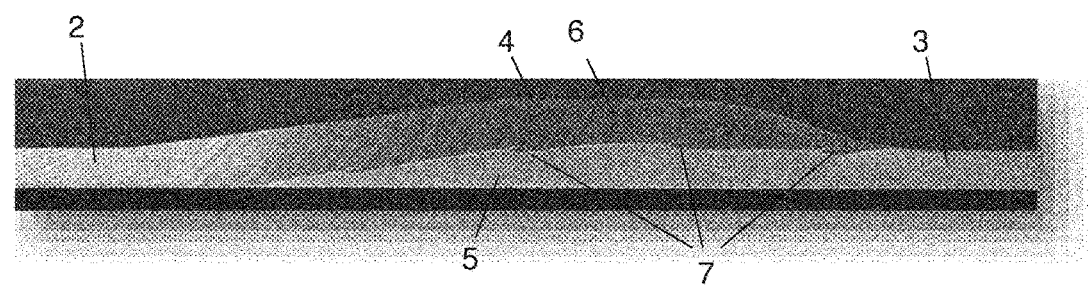
FIG. 2 is a longitudinal cross sectional picture of a part of a connection tube according to an embodiment, FIG. 3 schematically shows a composite tube manufactured using steps of the proposed method.

A connection tube 1 according to an embodiment of the present disclosure is shown in FIG. 1. The connection tube 1 has a central through-hole extending along a longitudinal axis A and has a first end portion 2 of a first alloy and a second end portion 3 of a second alloy. Between the end portions, a middle portion 4 which is double-layered extends. In the middle portion 4, the second alloy forms an annular inner layer 5 and the first alloy forms an annular outer layer 6. A metallic bond has been formed between the annular inner and outer layers 5, 6. The annular inner and outer layers 5, 6 are mechanically interlocked by means of at least one helically extending thread 7 formed in an interface between said layers 5, 6. The helically extending thread 7 is shown in FIG. 2, showing a cross sectional picture of a portion of a connection tube 1 according to an embodiment of the present disclosure.

The connection tube 1 has an inner diameter which is constant along the connection tube 1, i.e. at the first end portion 2, the middle portion 4 and the second end portion 3. The inner diameter may also vary along the connection tube, such that one of the end portions has a larger inner diameter than the other end portion. The connection tube 1 further has an outer diameter that is larger at the middle portion 4 than at the end portions 2, 3. A wall thickness of the connection tube 1 is therefore larger at the middle portion 4 than at the end portions 2, 3. In the shown embodiment, the wall thickness at the middle portion 4 may be approximately double the wall thickness at the end portions 2, 3.

Figure 3:
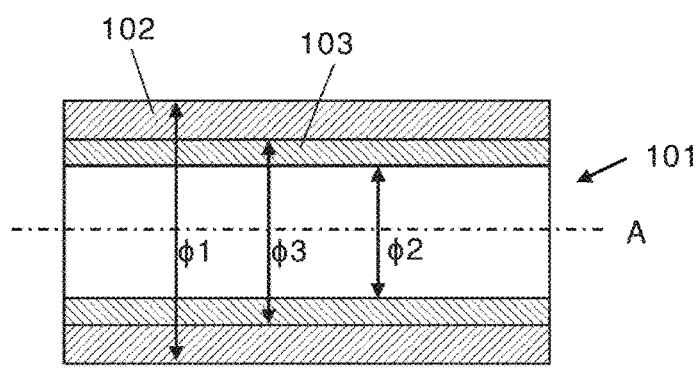
Figure 4:
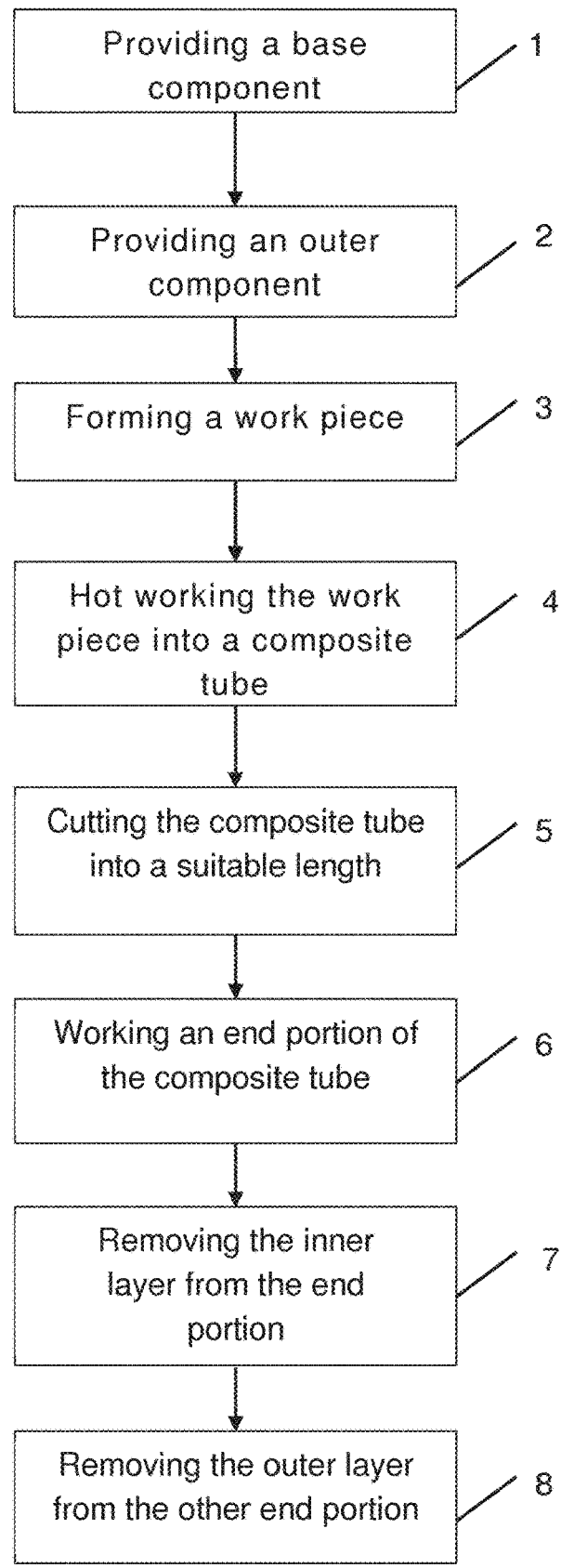
FIG. 4 is a flow chart illustrating an embodiment of the proposed method for manufacturing a connection tube, FIG. 5a-c schematically show a base component and an outer component used in an embodiment of the proposed method, FIG. 6 schematically shows a longitudinal cross section of parts of a base component and an inner component used in an embodiment of the proposed method, FIG. 7 schematically shows a longitudinal cross section of a composite tube manufactured using steps of the proposed method, and FIG. 8 schematically shows a longitudinal cross section of a tubular product according to an embodiment.
Figure 5A:
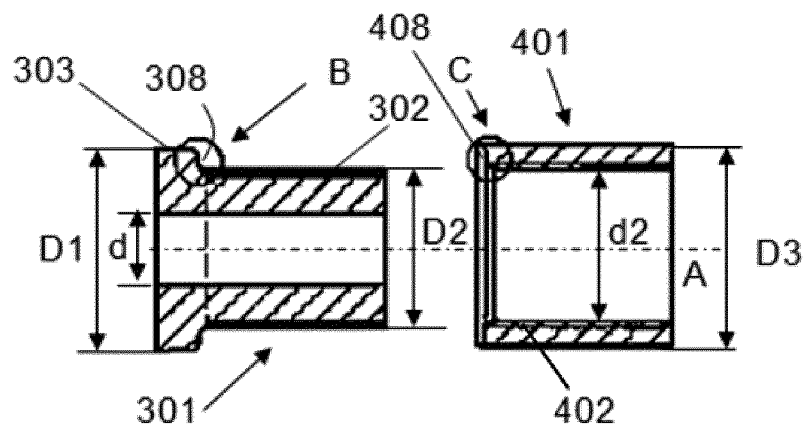
Figure 5B:
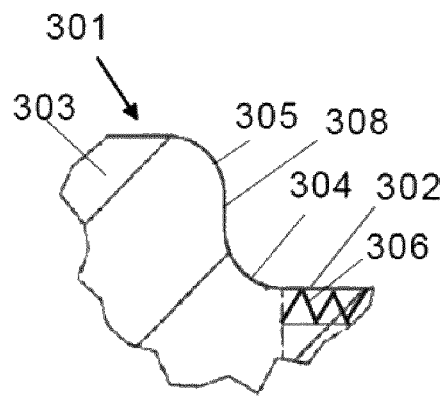
Figure 5C:
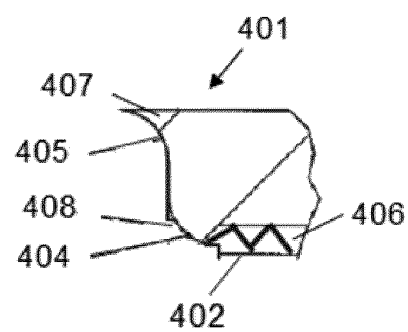
Figure 6:
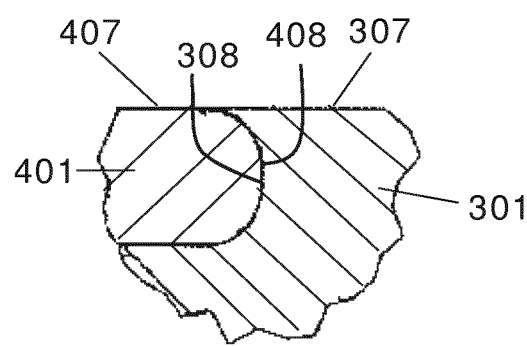

In a method for manufacturing a connection tube 1 according to an embodiment of the disclosure, a composite tube 101 as shown in FIG. 3 is first manufactured, having an annular outer layer 102 and an annular inner layer 103 and extending along the longitudinal axis A. A method for manufacturing a connection tube 1 is schematically illustrated in FIG. 4. Reference is also made to FIGS. 5a-c, showing a base component 301 and an outer component 401 used in the process, and to FIGS. 6-8.

In a first step 1, a base component 301 of the second alloy, which is to form the inner layer 5 of the connection tube 1 shown in FIG. 1, is provided. The base component 301 is a tube of circular cross section, having a central through-hole extending along the longitudinal axis A. An externally threaded section 302 is provided, having a helical thread 306 (see FIG. 5b) formed in an outer peripheral surface of the base component 301. The threaded section may extend over the entire base component or over a portion of the base component. In the embodiment shown in FIGS. 5a-c, it extends over an end portion of the base component 301, constituting a major part of the base component. The shown base component 301 also has a relatively short non-threaded section 303 adjacent the threaded section 302. An inner diameter d of the base component is constant or essentially constant along the longitudinal axis, but an outer diameter D1 of the non-threaded section 303 is larger than an outer diameter D2 of the threaded section 302.

In a second step 2, an outer component 401 of the first alloy is provided. The outer component 401 is also a tube of circular cross section, having a central through-hole extending along the longitudinal axis A. In the shown embodiment, the outer component 401 has a length in the longitudinal direction corresponding to a length of the threaded section 302 of the base component 301. The outer component 401 has an internally threaded section 402, in the shown embodiment extending along the entire length of the outer component 401. In other words, a helical thread 406 (see FIG. 5c) is formed in an inner peripheral surface of the outer component 401. The outer component 401 is thereby configured for threaded engagement with the externally threaded section 302 of the base component 301. An outer diameter D3 of the outer component 401 is equal to or essentially equal to the outer diameter D1 of the non-threaded section 303 of the base component 301, while an inner diameter d2 of the outer component 401 matches the outer diameter D2 of the threaded section 302 of the base component 301.

In a third step 3, a tubular work piece is formed by mounting the outer component 401 around the base component 301 such that the internally threaded section 402 of the outer component 401 is in engagement with the externally threaded section 302 of the base component 301, i.e. by threading the outer component 401 onto the threaded end portion of the base component 301. A mechanical interlock is thereby formed between the threaded sections 302, 402.

In a fourth step 4, the work piece formed in the third step 3 is hot worked, e.g. by means of hot extrusion. During hot working, a metallic bond is formed between the threaded sections 302, 402 while the mechanical interlock is maintained. An outer diameter of the work piece is also reduced and a composite tube is formed. The composite tube may be straightened and/or pickled after hot working.

In a fifth step 5, the composite tube is cut into a suitable length, for example by cutting off the ends of the composite tube so that possible defects and undesired features are removed. A middle part of the composite tube, corresponding to the composite tube 101 shown in FIG. 3, may thereafter be used in the following steps. The composite tube 101 has a dimension defined by an outer diameter φ1, an inner diameter φ2 and an interfacial diameter φ3.

Figure 7:
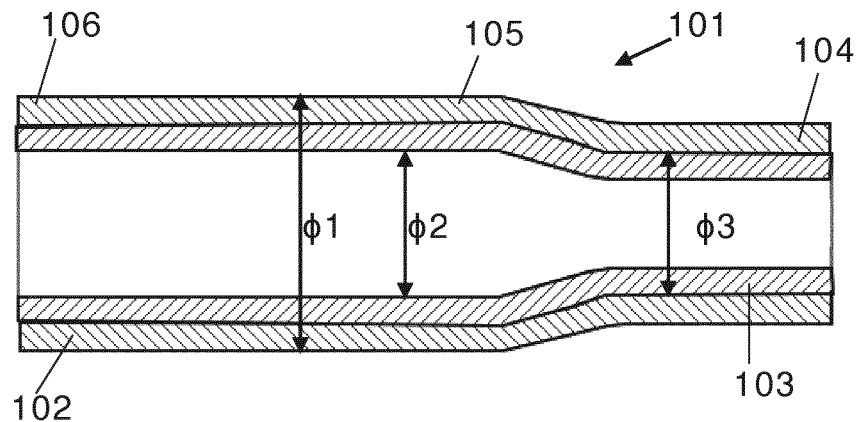

In a sixth step 6, a first end portion 104 of the composite tube 101, which first end portion 104 is to form the first end portion 2 of the connection tube 1, is worked such that the inner and outer diameters φ1, φ2 of the composite tube 101 gradually decreases from a middle portion 105 of the composite tube toward the first end portion 104 such as shown schematically in FIG. 7. This can be achieved for example by compressing the first end portion 104 or by expanding the second end portion 106.

In a seventh step 7, the annular inner layer 103 is removed from the first end portion 104 thereby an increased inner diameter φ2 is obtained, for example by cutting machining.

In an eighth step 8, the annular outer layer 102 is removed from a second end portion 106 of the composite tube 101, for example by cutting machining, thus forming a connection tube 1 having a first end portion 2 of the first alloy and a second end portion 3 of the second alloy such as shown in FIG. 1. One or both of the end portions may, if desired, be provided with an internal or external thread adapted for threaded engagement with a threaded end of a tube. Alternatively, the end portions may be configured to be joined with other tubes by means of welding.

The components 301, 401 shown in FIG. 5a are adapted for hot extrusion by pushing the work piece through an extrusion die with a leading end first, wherein the leading end is the end at which the outer component 401 is mounted. A transition surface 308 between the externally threaded section 302 of the base component 301 and the non-threaded section 303 is smooth, without sharp edges. The transition surface 308 is shown in more detail in FIG. 5b, showing a magnification of the encircled area B from FIG. 5a. The transition surface is in cross section shaped as an inverted S with a concave portion 304 closest to the threaded section 302, and a convex portion 305 closest to the non-threaded section 303. The outer component 401 has an end surface 408 with a corresponding S-shape with a convex portion 404 close to the internal thread 406, and a concave portion 405 close to an outer peripheral surface 407 of the outer component 401 as shown in FIG. 5c, showing a magnification of the encircled area C from FIG. 5a. The concave portion 405 of the end surface 408 will thereby overlap with the convex portion 305 of the transition surface 308, which prevents separation and penetration of oxygen during the extrusion process.

Another option is to let the leading end in the extrusion process be the end on which no outer component is mounted. In this case, shown in FIG. 6, the base component 301 is formed with a C-shaped concave transition surface 308, such that it floats over a rounded annular end surface 408 of the outer component 401 during extrusion and forms a seal. An outer peripheral surface 307 of the base component 301 thus overlaps the outer peripheral surface 407 of the outer component 401 when the components 301, 401 are mounted to form the work piece.

Figure 8:
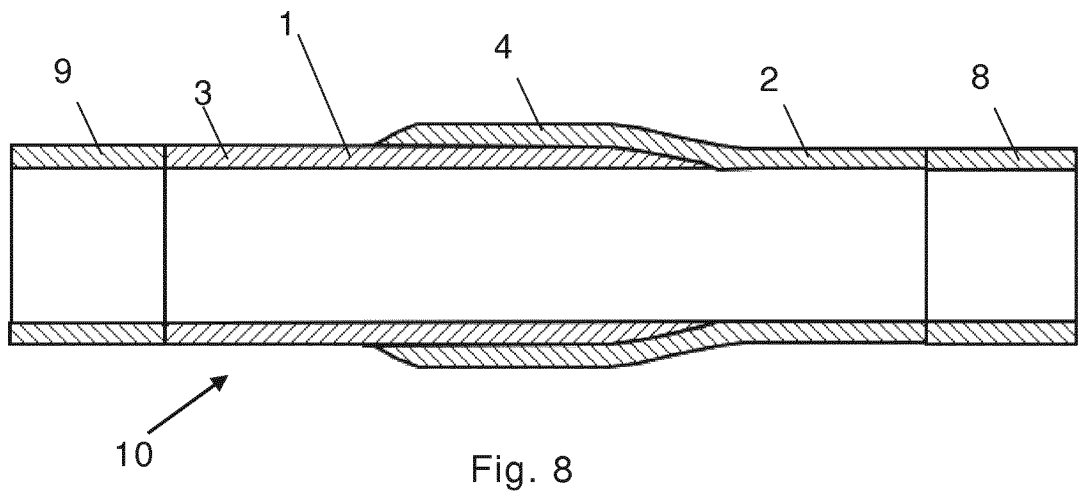

A method for connecting two tubes 8, 9 of different alloys according to an embodiment of the present disclosure in order to form a tubular product 10 as shown in FIG. 8 comprises providing a connection tube 1 as described above. The first alloy of the connection tube 1 is selected so that it is compatible with an alloy of a first one of the two tubes 8, 9 that are to be connected, and the second alloy of the connection tube 1 is selected so that it is compatible with an alloy of a second one of the two tubes 8, 9. The first tube 8 and the first end portion 2 of the connection tube 1 are joined together, e.g. by welding or by threaded engagement, depending on e.g. the weldability of the alloys used and the requirements on the joint. The second tube 9 and the second end portion 3 of the connection tube 1 are thereafter joined together, using a technique suitable with regard to e.g. the weldability of the alloys used and the requirements on the joint.

The formed tubular product 10 comprises the first tube 8, the second tube 9 and the connection tube 1.

Example

In a production trial, three connection tubes 1 as shown in FIG. 1-2 were manufactured. Three outer components of a first alloy and three base components of a second alloy were formed. The first alloy was in this case an austenitic stainless steel alloy according to ASTM 304L. The composition of the first alloy as measured in percent by weight (wt. %) is disclosed in Table I.

TABLE I

| C | Si | Mn | P | S | Cr | Ni | Fe |
|---|---|---|---|---|---|---|---|
| ≤0.030 | 0.5 | 1.3 | ≤0.030 | ≤0.015 | 18.5 | 10 | balance |

The second alloy was a carbon steel according to ASTM Grade A-1 having a composition in wt. % as disclosed in Table II.

TABLE II

| C | Si | Mn | P | S | Fe |
|---|---|---|---|---|---|
| 0.2 | 0.3 | 0.7 | ≤0.035 | ≤0.035 | Balance |

Each base component had a total length of 520 mm, an outer diameter of 140 mm, and an inner diameter of 50 mm. An externally threaded section having a length of 130 mm was formed by cutting machining. The outer components each had a length of 130 mm and an inner diameter of 110 mm and were provided with an internal thread. The components had the transitional design shown in FIG. 5a-c.

The outer components were washed in an alkaline ultrasonic bath and the base components were degreased using ethanol. The outer components were thereafter threaded onto the base components to form work pieces.

The work pieces were pre-heated at 400° C. for four hours and were thereafter hot extruded with the end on which the outer component was mounted as the leading end. The work pieces were subsequently cooled, straightened and pickled to form composite tubes. A double-layered middle part of each resulting composite tube was cut out and heated. A second end portion 106 was expanded (upset) as shown in FIG. 7. Thereafter, the annular inner layer 103 was removed from the first end portion 104 and the annular outer layer 102 was removed from the second end portion 106 using cutting machining, thereby forming connection tubes.

Material characterisation using optical microscopy of samples etched initial and phosphoric acid showed that a metallic bond was formed between the components during hot extrusion. This was also confirmed using ultrasound. A helically extending thread 7 was clearly visible in the interface between the inner and outer layers 5, 6 of the connection tubes 1 as shown in FIG. 2.

The proposed methods, connection tube and tubular product are not limited to the embodiments described above, but many possibilities to modifications thereof would be apparent to a person with skill in the art without departing from the scope of the appended claims.

The invention claimed is:

1. A method for manufacturing a connection tube for connecting two tubes of different alloys, comprising the steps of:
forming a composite tube having an annular outer layer of a first alloy and an annular inner layer of a second alloy;
working a first end portion of the composite tube such that a diameter of the composite tube gradually decreases from a middle portion of the composite tube toward the first end portion;
removing the annular inner layer from the first end portion; and
removing the annular outer layer from a second end portion of the composite tube, thus forming a connection tube having a first end portion of said first alloy and a second end portion of said second alloy,
wherein the step of forming the composite tube comprises the steps of:
providing an annular base component of the second alloy, wherein the annular base component has a central through-hole extending along a longitudinal axis of the annular base component, wherein the annular base component has a threaded section with a helically extending external thread and a non-threaded section with a transition surface including a first plurality of surface portions, wherein one of the first plurality of surface portions is concave or convex,
providing an annular outer component of the first alloy, wherein the annular outer component has a threaded section with a helically extending internal thread configured to engage with the helically extending external thread of the threaded section of the annular base component and a non-threaded section with an end surface including a second plurality of surface portions, wherein one of the second plurality of surface portions is concave or convex and the end surface is configured to conformally engage with the transition surface of the non-threaded section of the annular base component,
forming a tubular work piece by mounting the annular outer component around the annular base component such that (i) the helically extending internal thread of the threaded section of the annular outer component is in engagement with the helically extending external thread of the threaded section of the annular base component, forming a mechanical interlock between the threaded sections, and (ii) the end surface of the non-threaded section of the annular outer component conformally engages with the transition surface of the non-threaded section of the annular base component, and
hot working the tubular work piece, wherein hot working (a) forms a metallic bond between the helically extending internal thread of the threaded section of the annular outer component and the helically extending external thread of the threaded section of the annular base component while the mechanical interlock and conformal engagement between the end surface of the non-threaded section of the annular outer component and the transition surface of the non-threaded section of the annular base component are maintained, and (b) elongating the tubular work piece and reducing an outer diameter of the tubular work piece.

2. The method according to claim 1, wherein the composite tube has a dimension defined by an outer diameter ($\varphi 1$), an inner diameter ($\varphi 2$) and an interfacial diameter ($\varphi 3$), and wherein the step of working the first end portion of the composite tube is carried out such that the interfacial diameter ($\varphi 3$) of the first end portion corresponds to the inner diameter ($\varphi 2$) of the middle portion.

3. The method according to claim 1, wherein at least one of the step of removing the annular inner layer and the step of removing the annular outer layer comprises cutting machining and/or abrasive machining.

4. The method according to claim 1, wherein the threaded section extends along a major part of an axial length of the annular base component.

5. The method according to claim 1, wherein the internally threaded section extends along a major part of an axial length of the annular outer component.

6. The method according to claim 1, wherein the step of hot working comprises hot extrusion.

7. The method according to claim 1, wherein the first alloy is selected from a stainless steel alloy, a nickel-based alloy, an iron chromium aluminium alloy, a carbon steel alloy, a zirconium alloy, an aluminium alloy, a copper alloy, or a titanium alloy.

8. The method according to claim 1, wherein the second alloy has a different composition than the first alloy and is selected from a stainless steel alloy, a nickel-based alloy, an iron chromium aluminium alloy, a carbon steel alloy, a zirconium alloy, an aluminium alloy, a copper alloy, or a titanium alloy.

9. The method according to claim 1, wherein a first one of the first plurality of surface portions is concave and a second one of the first plurality of surface portions is convex.

10. The method according to claim 9, wherein the first one of the first plurality of surface portions is at a first end of the transition surface and the second one of the first plurality of surface portions is at a second end of the transition surface.

11. The method according to claim 10, wherein the second end of the transition surface is radially outward of the first end of the transition surface.

12. The method according to claim 9, wherein the transition surface is S-shaped and the first one of the first plurality of surface portions is at a first end of the transition surface and the second one of the first plurality of surface portions is at a second end of the transition surface.

13. The method according to claim 1, wherein a first one of the first plurality of surface portions is convex and a second one of the first plurality of surface portions is convex.

\* \* \* \* \*